United States Patent
Nazarov et al.

(10) Patent No.: US 11,734,290 B1
(45) Date of Patent: Aug. 22, 2023

(54) COMPUTATIONALLY EFFICIENT CARDINALITY-ESTIMATION TECHNIQUES

(71) Applicant: Amazon Technologies, Inc., Seattle, WA (US)

(72) Inventors: Alexander A Nazarov, Redmond, WA (US); Erica Michele Yoshimoto, Seattle, WA (US); Mikhail Smarshchok, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 188 days.

(21) Appl. No.: 17/103,027

(22) Filed: Nov. 24, 2020

(51) Int. Cl.
| G06F 16/2458 | (2019.01) |
| G06F 16/23 | (2019.01) |
| G06F 16/22 | (2019.01) |
| G06F 16/27 | (2019.01) |
| H04L 67/75 | (2022.01) |

(52) U.S. Cl.
CPC ...... G06F 16/2462 (2019.01); G06F 16/2255 (2019.01); G06F 16/2358 (2019.01); G06F 16/27 (2019.01); H04L 67/75 (2022.05)

(58) Field of Classification Search
CPC ... G06F 16/285; G06F 16/2246; G06N 20/00; G06N 5/022; G06N 5/003
USPC .............................................. 707/713; 706/12
See application file for complete search history.

(56) References Cited

U.S. PATENT DOCUMENTS

2021/0359836 A1* 11/2021 Wright .................... H04L 9/008

OTHER PUBLICATIONS

Hartmann, Florian. "Count-Min Sketch" Jul. 2019. https://florian.github.io/. pp. 1-15. Access date Sep. 9, 2022. (Year: 2019).*
Cormode, G. (2017). What is Data Sketching, and Why Should I Care?. Communications of the ACM (CACM), 60(9), 48-55. (Year: 2017).*
Graham Cormode and S. Muthukrishnan. 2005. An improved data stream summary: the count-min sketch and its applications. Journal of Algorithms 55, 1 (2005), 58-75 (Year: 2005).*

* cited by examiner

Primary Examiner — Michael Pham
(74) Attorney, Agent, or Firm — Lee & Hayes, P.C.

(57) ABSTRACT

This disclosure describes, in part, techniques for estimating frequency values of top contributors of a high cardinality data set in a computationally efficient manner. In one example, the techniques utilize a probabilistic data structure, such as a count-min-sketch, for identifying which contributors are the largest contributors to a particular metric. After identifying these largest contributors using the probabilistic data structure, the techniques may store the contributor IDs and the their respective estimated cumulative value (e.g., frequency counts) in a top-N list.

20 Claims, 13 Drawing Sheets

700 ↘

```
         ⟲7A⟳
           ↓
┌─────────────────────────────────────────────────────────────────────┐
│  UPDATE, USING THE FIRST COUNT VALUE, A SECOND COUNTER ASSOCIATED   │
│  WITH THE SECOND CELL FROM A THIRD SKETCH VALUE TO A FOURTH         │
│  SKETCH VALUE                                                        │
│                              720                                     │
└─────────────────────────────────────────────────────────────────────┘
                                ↓
┌─────────────────────────────────────────────────────────────────────┐
│  DETERMINE THAT THE SECOND SKETCH VALUE IS A MINIMUM VALUE FROM A   │
│  SET OF VALUES THAT INCLUDES AT LEAST THE SECOND SKETCH VALUE AND   │
│  THE FOURTH SKETCH VALUE                                             │
│                              722                                     │
└─────────────────────────────────────────────────────────────────────┘
                                ↓
┌─────────────────────────────────────────────────────────────────────┐
│  DETERMINE THAT THE SECOND SKETCH VALUE IS GREATER THAN THE         │
│  SMALLEST SKETCH VALUE REPRESENTED IN THE LIST                      │
│                              724                                     │
└─────────────────────────────────────────────────────────────────────┘
                                ↓
┌─────────────────────────────────────────────────────────────────────┐
│  DELETE, FROM THE LIST, A SECOND CONTRIBUTOR ID ASSOCIATED WITH     │
│  THE SMALLEST SKETCH VALUE                                           │
│                              726                                     │
└─────────────────────────────────────────────────────────────────────┘
                                ↓
┌─────────────────────────────────────────────────────────────────────┐
│         STORE, IN THE LIST, THE FIRST CONTRIBUTOR ID                 │
│                              728                                     │
└─────────────────────────────────────────────────────────────────────┘
                                ↓
┌─────────────────────────────────────────────────────────────────────┐
│  STORE, IN THE LIST, THE SECOND SKETCH VALUE IN ASSOCIATION WITH    │
│  THE FIRST CONTRIBUTOR ID                                            │
│                              730                                     │
└─────────────────────────────────────────────────────────────────────┘
                                ↓
┌─────────────────────────────────────────────────────────────────────┐
│  DETERMINE AND STORE, IN THE LIST, A FIRST FREQUENCY COUNT          │
│  ASSOCIATED WITH THE FIRST CONTRIBUTOR ID                            │
│                              732                                     │
└─────────────────────────────────────────────────────────────────────┘
```

FIG. 7B

COMPUTATIONALLY EFFICIENT CARDINALITY-ESTIMATION TECHNIQUES

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

A customer of such a service provider may configure numerous resources of the service provider to provide one or more services to a large number of users, each of whom may access the resources and consume the services using respective client devices. In some instances, the service provider may generate data indicative of one or more metrics associated with the services and may present information regarding these metrics to the customer. For example, the service provider may generate data indicating the number of client devices accessing the services of the customer, regions from which the client devices are accessing the services, which files the client devices are accessing, which files are causing errors in the services, and/or any other type of information. While these metrics may be useful to the customer of the service provider, in some instances the size of the data set underlying these metrics, perhaps numbering in the millions, may make it difficult for the service provider to generate this data in a computationally efficient, or feasible, manner.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 7A-B collectively illustrate a flow diagram of an example process for using both a probabilistic data structure and a top-N-list data structure for maintaining metrics information in a computationally efficient manner.

DETAILED DESCRIPTION

Figure 1:
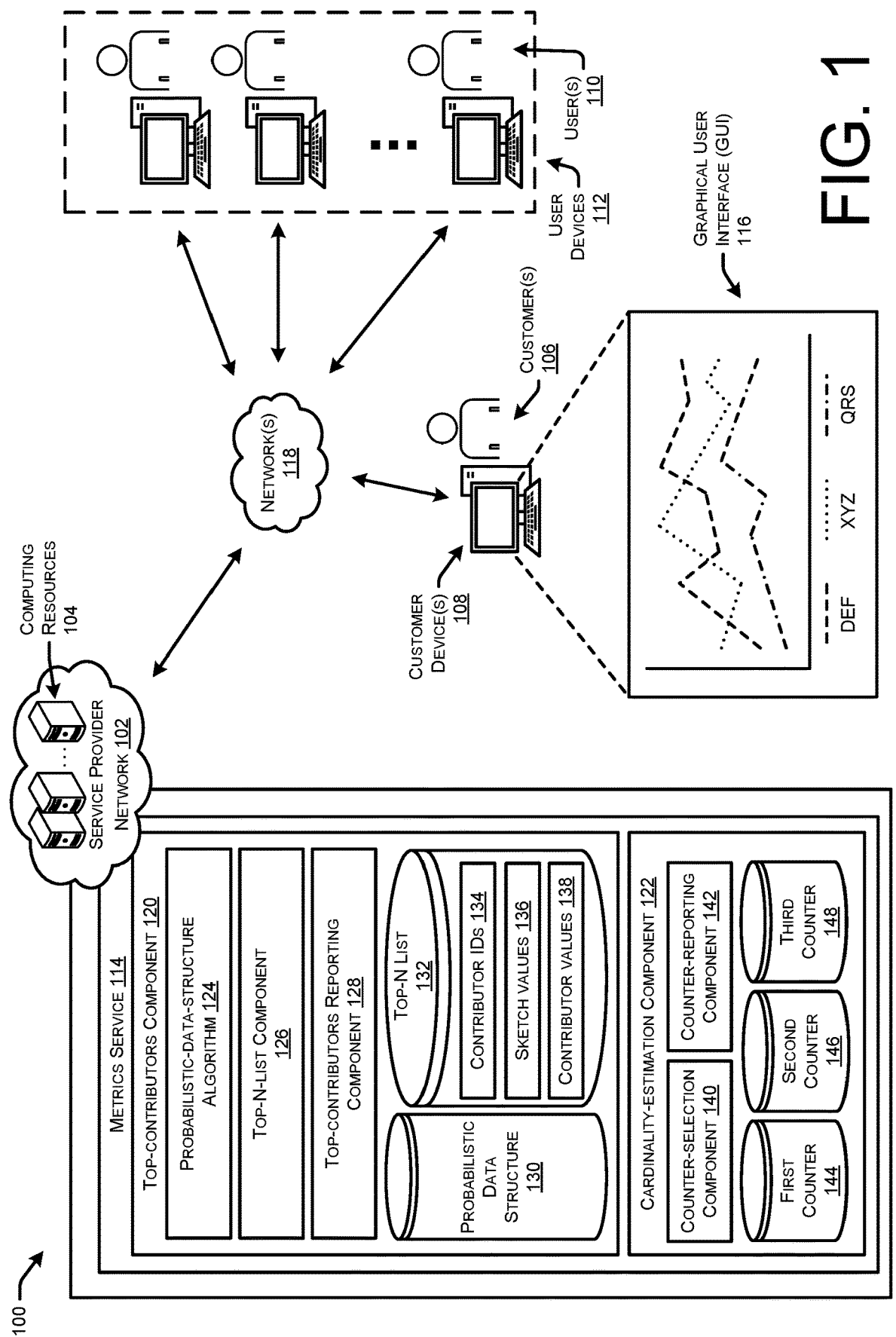
FIG. 1 illustrates a system-architecture diagram of an example environment in which a service provider network provides computing resources to enable a customer of the service provider network to configure one or more services by use by one or more users operating respective client computing devices. As illustrated, the service provider network may further include a metrics service, which may generate metrics data and may present this metrics data to the customer. In some instances, the metrics service maintains a list of top contributors associated with a particular metric using both a probabilistic data structure and a top-N list, thus enabling the service provider network to maintain an accurate top-N list of contributors in a computationally efficient manner.

This disclosure describes, in part, techniques for estimating frequency values of top contributors of a high cardinality data set in a computationally efficient manner. As introduced above, a service provider network may offer various network-based (or "cloud-based") services to customers to fulfill computing needs of the customers. Each customer may configure resources of the service provider network to provide one or more services of the customer, with the services potentially being used, in turn, by one or more users operating respective client computing devices.

In addition to providing resources to allow an example customer to create a desired network-accessible service, the service provider network may provide a metrics service that functions to generate metrics data associated with the service created by the customer and present the metrics data to the customer via a computing device of the customer. These metrics data may comprise any sort of data associated with the service, such as the most-requested files, the file or portion of the service that is causing the most errors for the user devices, the regions from which users are accessing the service, or any other type of metric. In some instances, however, this data set may be unbounded and/or extremely large in size. Thus, tracking contributors associated with a particular metric and a cumulative value associated with each contributor may be computationally expensive and, in some instances, entirely infeasible. For example, envision that a customer of the service provider network hosts a service having millions upon millions of images that are viewable on user devices, and that the customer has requested that the metrics maintain an ordered list of the images according to the number of times that user devices have requested to view the images. Given that there are millions of images and, perhaps, millions of requests for the images, maintaining an ordered list in the manner requested by the customer may be of a such a computational expensive so as to be infeasible.

The techniques described below, however, enable the metrics service in this and other examples to maintain a top-N list of contributors and their associated cumulative values in a much more computationally efficient and feasible manner. To do so, the metrics service may first utilize a probabilistic data structure for identifying those contributors associated with a particular metric that are likely to have the highest frequency value as it pertains to the metric. For instance, using the example above where the customer has requested that the metrics service maintain a list of the most requested images and the number of these requests, the metrics service may use the probabilistic data structure to identify which images have likely been requested the most. After identifying these largest contributors, the metrics service may then store information regarding these contributors, and their estimated cumulative values, in a top-N list. By first utilizing a probabilistic data structure to identify the likely top contributors for a particular metric and thereafter storing more detailed data associated with these contributors in a top-N list, the techniques thus provide the customer with detailed information regarding the largest contributors of a particular metric without an undue computational expense. In fact, for certain large, unbounded data sets, generating this metrics data may be infeasible without an extraordinary amount of computational resources, while the described techniques enable the generation of this data using a fraction of these computational resources.

In one example, the techniques utilize a count-min-sketch probabilistic data structure for initially identifying the likely top-N contributors associated with a given metric. Of course, while examples herein describe using a count-min-sketch data structure, it is to be appreciated that the techniques may utilize any other type of probabilistic data structures for identifying the likely top-N contributors, such as Bloom filters, HyperLogLog, count sketch, and/or the like.

Using the example of a count-min-sketch probabilistic data structure, a metrics service described herein may receive data indicative of a particular contributor and a value (e.g., a count or any other metric) associated with the contributor. For example, continuing the example from above, the metrics service may receive data indicating that a particular image (indicated by a unique "contributor identifier (ID)") was requested a certain number of times (frequency count) in a particular time frame, that a certain number of bytes of a file were requested or downloaded in the particular time frame, or the like. Upon receiving this data, the metrics service may generate a sketch value associated with the data using the contributor ID, the value, and the existing count-min-sketch. For example, the count-min-sketch probabilistic data structure may comprise a series of columns and rows, with each column associated with a particular hash function for mapping a contributor ID to one of the rows (or cells) with each respective column. For example, envision a count-min-sketch having a size of three columns and four rows. Each of the three columns may be associated with a particular hash function for mapping each contributor ID to one of the four rows within the respective column.

Continuing the example from above, for instance, envision that the metrics service receives data that, for a given time period, a particular image entitled "Image_123" was requested five times. The metrics service may use the contributor ID ("Image_123") to compute a first hash value using a first hash function associated with the first column of the count-min-sketch, a second hash value using a second hash function associated with the second column of the count-min-sketch, and a third hash value using a third hash function associated with the third column of the count-min-sketch. Each of these hash values may map or associate the contributor ID with a particular row in each column. For instance, the first hash value may indicate that the contributor ID is associated with the second row in the first column, the second hash value may indicate that the contributor ID is associated with the first row in the second column, and the third hash value may indicate that the third hash value is associated with the fourth row in the third column.

After determining the respective cell/row within each column, the metric service may update a "sketch value" of this cell by the current value (in this case, five). For instance, if this were the first use of the count-min-sketch, then the value of each of these three cells would be five, while all other cells would remain zero. If, however, the metrics service has been utilizing the count-min-sketch for some time, then each cell (including the three to which the current contributor ID has been mapped to) are likely to have values great (and potentially much greater than zero). Again, in this instance the metrics service may increase the sketch value of each of these cells by five, the current value associated with the current identified event.

Thereafter, the metrics service may identify, from the three cells, the minimum sketch value, which may be used to determine whether the current contributor ("Image_123") is to be included in a top-N list maintained by the metrics service. To do so, the metrics service may compare the minimum sketch value associated with the contributor to a minimum sketch value associated with the top-N list. The minimum sketch value associated with the top-N list may comprise the smallest sketch value associated with a contributor included in the top-N list.

As the reader will appreciate, each of the first "N" analyzed contributors will fill the top-N list, but thereafter each newly calculated sketch value will be compared against the minimum sketch value associated with the top-N list to determine whether the corresponding contributor is to be included in the top-N list. For instance, continuing the example, envision that the minimum sketch value associated with "Image_123" is 47 and minimum sketch value associated with a contributor ID (e.g., "Image_123") stored in the top-N list is 44. The metrics service may determine that the minimum sketch value associated with "Image_123" (47) is greater than the minimum sketch value associated with the top-N list (44).

After making this determination, the metrics service may determine whether the contributor ID ("Image_123") is already represented in the top-N list. If so, then the metrics service may update the estimated cumulative value associated with this contributor ID by the current value (here, five). If, however, "Image_123" is not currently represented in the top-N list, then the metrics service may update the top-N list to include this new contributor and to remove the contributor ID associated with the previous minimum sketch value associated with the top-N list (here, "Image_789").

When the metrics service updates the top-N list to include a new contributor ID, such as "Image_123", the metrics service may store a sketch value and an estimated cumulative value (e.g., an estimated frequency count) in association with this contributor ID. In some instances, the metrics service may determine the sketch value to be the minimum sketch value associated with the contributor ID as described above (e.g., 47), while determining the estimated cumulative value for the contributor ID to be the lesser of: (i) the sketch value of the new contributor ID, or (ii) the estimated cumulative value of the now-removed contributor ID (e.g., "Image_789") plus the current value associated with the new contributor ID (here, five). Finally, after updating the top-N list to include the new contributor ID and its corresponding sketch value and estimated cumulative value, the metrics service may determine whether a new minimum sketch value associated with the top-N list exists and, if so, may store an indication of the new minimum sketch value for the list.

As the reader will appreciate, using the combination of a probabilistic data structure (e.g., count-min-sketch) to determine whether a contributor ID warrants inclusion in a top-N list enables the metrics service to efficiently track top contributors and their estimated cumulative values in an efficient, feasible manner, thus improving operation of the metrics service and the underlying service provider network. The techniques thus balance computational efficiency with accuracy, in that the resulting estimated cumulative values of the top contributors are generally accurate in terms of proportionality to other contributors of a metric, while not exact.

In addition to the above, this disclosure describes techniques for efficiently counting and maintaining a number of unique contributors in an unbounded data set. In some instances, the techniques use varying data structures based on the size of a data set, with smaller data sets using a more accurate data structure and larger data sets using a probabilistic data structure configured to efficiently estimate the number of unique contributors. Thus, the techniques again balance computational efficiency with cardinality accuracy.

In some instances, the metrics service may store a number of unique contributors for a particular metric (and across multiple metrics) using multiple data structures. For example, the metrics service may utilize a hash-table data structure for data sets having a number of unique contributors that is smaller than a first threshold, a linear-counter data structure for data sets having a number of unique contributors that is greater than the first threshold but smaller than a second threshold, and a probabilistic data structure (e.g., a LogLog counter) for data sets having a number of unique contributors that is greater than the second threshold.

For example, upon receiving data indicating that a contributor ID associated with a particular metric, the metrics service may initially query the hash-table data structure to determine whether it is saturated (or full). If not, then the metrics service may store data associated with this contributor ID in the hash-table data structure. This may include storing data associated with this unique contributor ID (e.g., a hash value of the ID, the contributor ID itself, etc.). If, however, the hash-table data structure has already stored this contributor ID, then the metrics service may update a counter to indicate that this contributor ID has been seen again.

In addition to storing data in the hash-table data structure, the metrics service may determine whether a linear-counter data structure is saturated. If not, then the metrics service may store data associated with the contributor ID in a linear-counter data structure, which may comprise a data structure that maintains a count of unique contributors. The metrics service may then additionally store data updating a count maintained by a probabilistic data structure, which may maintain an estimated count of unique contributors. Further, if the metrics service determines that the linear-counter data structure was saturated, the metrics service may update the probabilistic data structure.

If, however, the hash-table data structure is saturated, then the metrics service may determine whether the linear-counter data structure is saturated. If not, then the metrics service may update the linear counter, as well as the probabilistic data structure. If, however, the linear-counter data structure is saturated, then the metrics service may update the probabilistic data structure.

As the reader will appreciate, the hash-table data structure will saturate after a first "N" number of unique contributor IDs are received (where "N" represents a maximum storage size of the hash-table data structure). Further, the linear-counter data structure will saturate after a first "M" number of unique contributors are received (where "M" represents a maximum storage size of the linear-counter data structure and M>N). Finally, after receiving "M" unique contributors, the metrics service will update the probabilistic data structure without updating the hash-table data structure or linear-counter data structure. Further, given that the hash-table data structure is able to maintain the names of the contributor IDs and their respective counts, while the linear counter maintains the number of unique contributor IDs, and the probabilistic data structure is able to maintain an estimated number of unique contributor IDs, the metrics service maintains more accurate data for smaller data sets than moderate and large data sets, moderately accurately data for moderately sized data sets, and less accurate, probabilistic data for large data sets. Thus, the metrics service balances data accuracy with computational efficiency.

In addition to storing the data as described above, the metrics service may enable customers to query the stored data accordingly. For example, if a customer uses a device to request data regarding a number of unique contributors for a particular metric, the metrics service may initially query the hash-table data structure to determine if it is saturated. If not, the metrics service may read the requested data from the hash-table data structure and provide this data to the requesting device. Again, this data may comprise the names of the unique contributor IDs and their respective counts or, in some instances, may comprise the number of unique contributor IDs.

If, however, the hash-table data structure is saturated, then the metrics service may determine whether the linear-counter data structure is saturated. If not, then the metrics service may read the requested data from the linear-counter data structure and provide this data to the requesting device. Again, this data may comprise the number of unique contributor IDs. Finally, if the linear-counter data structure is saturated, then the metrics service may read the data from the probabilistic data structure and may provide this data representing the estimated number of unique contributor IDs to the requesting device. By utilizing this multi-tiered data structure approach, the metrics service thus enables extremely high accuracy for smaller data sets and less, but still high, accuracy for very large unbounded data sets. Thus, the metrics service is able to store and report data in a computationally efficient and still accurate manner across varying sizes of unbounded data sets, both small and extremely large.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 provides computing resources 104 to enable a customer 106 of the service provider network 102 (using a customer device 108) to configure one or more services by use by one or more users 110 operating respective user computing devices 112. As illustrated, the service provider network 102 may further include a metrics service 114, which may generate metrics data and may present this metrics data to the customer, such as via example graphical user interface (GUI) 116. In some instances, the metrics service observes and generates time-series data representing counts or other values that grow or otherwise change over time. For example, the metrics service 114 may maintain a list of top contributors associated with a particular metric using both a probabilistic data structure and a top-N list, thus enabling the service provider network 102 to maintain an accurate top-N list of contributors in a computationally efficient manner.

As illustrated, a service provider network 102 may be operated and/or managed by a service provider. The service provider network 102 may provide various services to customers 106 to fulfil their computing resource needs, such as cloud-based computing resources. For example, the service provider network 102 may provide cloud-based, scalable, and network accessible compute power services, storage services, database services, and/or other services. Customers 106 of the service provider network 102 may utilize customer devices 108 to subscribe for use of the computing resources and/or services provided by the service provider network 102. Further, users 110 may operate respective user computing devices 112 to access and utilize the services of the customers 106 of the service provider network 102.

In some instances, the service provider network 102 may span across different geographic regions and include or be associated with clusters of managed computing devices (e.g., servers) stored in data centers located across the different geographic regions. In this way, customers 106 who have subscribed for use of the network-based services supported by computing resources in the data centers need not invest in and maintain the computing infrastructure required to implement the various services that they may need. Generally, the computing resources 104 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing resources 104 may be various types of computing devices, such as devices that have different chip set generations, are from different vendors, have different hardware architectures, and so forth.

Thus, the computing resources 104 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

In some instances, customers 106 may create user accounts with the service provider to utilize the resources and services of the service provider network 102. The customers 106 may utilize their user devices 108 to communicate over one or more networks 118 (e.g., WANs, PANs, LANs, etc.) with the service provider network 102. The customer devices 108, as well as the user devices 112, may comprise any type of computing device configured to communicate over network(s) 118, such as mobile phones, tablets, laptop computers, desktop computers, televisions, servers, and/or any other type of computing device.

As illustrated, the service provider network 102 may comprise the metrics service 114, which may generate and present metrics data for customers 108. For example, the metrics service 114 may generate metrics data indicating an estimated cumulative value (e.g., frequency count) of each of multiple contributor IDs associated with a given metric. These metrics may comprise any sort of data associated with the service of the customer 108, such as the most-requested files, the file or portion of the service that is causing the most errors for the user devices, the regions from which users are accessing the service, or any other type of metric. The example GUI 116, for instance, illustrates a cumulative value over time for three top contributors for a particular metric. In some instances, this data set may be unbounded and/or extremely large in size. Thus, tracking contributors associated with a particular metric and a cumulative value associated with each contributor may be computationally expensive and, in some instances, entirely infeasible.

In order to generate this metrics data in a computationally efficient, but still accurate manner, the metrics service 114 may include a top-contributors component 120 and a cardinality-estimation component 122. As illustrated, the top-contributors component 120 may include a probabilistic-data-structure algorithm 124, a top-N-list component 126, and a top-contributors reporting component 128. The probabilistic-data-structure algorithm 124 may be configured to receive event data indicative of contributor IDs and respective current cumulative value to determine whether each corresponding contributor ID is associated with a large value such that the contributor ID should be included in a top-N list. The top-N-list component 126, meanwhile, stores information regarding the top contributor IDs, such as these IDs and their estimated cumulative value. The top-contributors reporting component 128 may receive requests for metrics data and generate the data for presentation to a customer, such as via the GUI 118. FIG. 1 further illustrates, that the metrics service 114 stores a probabilistic data structure 130 and a top-N list 132, which stores one or more contributor IDs 134, their respective sketch values 136, and their respective contributor value 138 (e.g., their cumulative value over time, such as their estimated frequency counts).

Upon receiving data indicative of a contributor ID pertinent to a particular metric, the probabilistic-data-structure algorithm 124 may use the probabilistic data structure 130 to determine whether the corresponding contributor ID is to be included in the top-N list 132. In some examples, the probabilistic data structure 130 may comprise a count-min-sketch for initially identifying the likely top-N contributors associated with a given metric. It is to be appreciated, however, that the probabilistic data structure 130 may comprise any other type of probabilistic data structure for identifying the likely top-N contributors, such as Bloom filters, HyperLogLog, count sketch, and/or the like.

Regardless of the type of the probabilistic data structure 130, the probabilistic-data-structure algorithm 124 may receive data indicative of a particular contributor and a value associated with the contributor. For example, the algorithm 124 may receive data indicating that a particular file (indicated by a unique "contributor identifier (ID)") was requested a certain number of times (e.g., frequency count) in a particular time frame, from a particular user or region, or the like. Upon receiving this data, the probabilistic-data-structure algorithm 124 may use the probabilistic data structure 130 to generate a sketch value associated with the data using the contributor ID and the value. Using a count-min-sketch probabilistic data structure as an example, the probabilistic data structure may comprise a series of columns and rows, with each column associated with a particular hash function for mapping a contributor ID to one of the rows (or cells) with each respective column.

Figure 2:
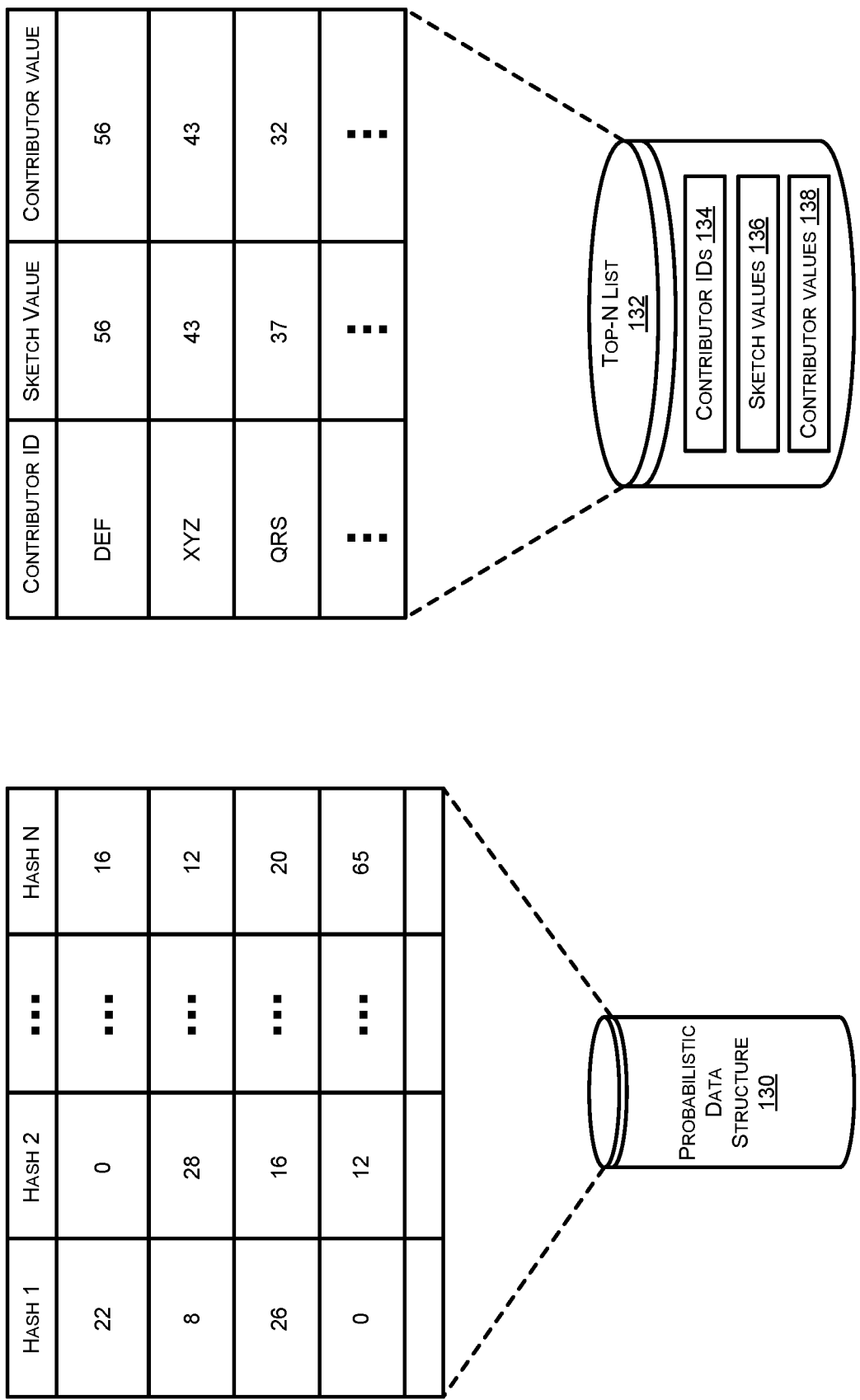
FIG. 2 illustrates an example probabilistic data structure and top-N list that the metrics service of FIG. 1 may utilize to generate the metrics data introduced above.

FIG. 2, for example, illustrates an example probabilistic data structure 130. In this example, the probabilistic data structure 130 comprises a number, "N", columns, with each column associated with a corresponding hash function for mapping each contributor ID to one of the rows of the data structure within each respective column. Each cell, meanwhile, may comprise a sketch value that may be used to determine whether a contributor ID is to be included in the top-N list 132, as described in detail below.

Continuing the example from above, for instance, envision that the probabilistic-data-structure algorithm 124 receives data that, for a given time period, a particular image entitled "Image_123" was requested five times. The probabilistic-data-structure algorithm 124 may use the contributor ID ("Image_123") to compute a first hash value using a first hash function associated with the first column of the probabilistic data structure 130, a second hash value using a second hash function associated with the second column of the probabilistic data structure 130, and a $N^{th}$ hash value using an $N^{th}$ hash function associated with the $N^{th}$ column of the $N^{th}$. Each of these hash values may map or associate the contributor ID with a particular row in each column. For instance, the first hash value may indicate that the contributor ID is associated with the second row in the first column, the second hash value may indicate that the contributor ID is associated with the first row in the second column, and the $N^{th}$ hash value may indicate that the $N^{th}$ hash value is associated with the third row in the $N^{th}$ column.

After determining the respective cell/row within each column, the probabilistic-data-structure algorithm 124 may update a "sketch value" of this cell by the current value (in this case, five). For instance, using the example probabilistic data structure of FIG. 2, the probabilistic-data-structure algorithm 124 may update the counter associated with the second cell in the first column from eight to thirteen, the counter associated with the first cell in the second column from zeo to five, and the counter associated with the third cell in the $N^{th}$ column from thirty-two to thirty-seven.

Thereafter, the probabilistic-data-structure algorithm 124 may identify, from the N number of cells, the minimum sketch value, which may be used to determine whether the current contributor ("Image_123") is to be included in a top-N list 132. To do so, the probabilistic-data-structure algorithm 124 may compare the minimum sketch value associated with the contributor (e.g., five in this instance) to a minimum sketch value associated with the top-N list 132. The minimum sketch value associated with the top-N list may comprise the smallest sketch value associated with a contributor included in the top-N list.

If the probabilistic-data-structure algorithm 124 determines that the minimum sketch value from the probabilistic data structure 130 is greater than the minimum sketch value associated with the top-N list 132, then the probabilistic-data-structure algorithm 124 (or the top-N-list component 126) may determine that the corresponding contributor ID is to be included in the top-N list 132. After this determination is made, the top-N-list component 126 may determine a sketch value and a contributor value to store in association with the contributor ID in the top-N list 132. Again, each contributor value stored in the top-N list 132 may comprise a cumulative value associated with a respective contributor ID, with this cumulative value representing a cumulative count associated with the contributor ID or any other cumulative metric associated with the contributor ID.

To do so, the top-N-list component 126 may first determine whether the contributor ID ("Image_123") is already represented in the top-N list 132. If so, then the top-N-list component 126 may update the contributor value (e.g., estimated frequency count) associated with this contributor ID by the current value (here, five). If, however, "Image_123" is not currently represented in the top-N list, then the top-N-list component 126 may update the top-N list 132 to include this new contributor ID and to remove the contributor ID associated with the previous minimum sketch value associated with the top-N list 132.

When the top-N-list component 126 updates the top-N list 132 to include a new contributor ID, such as "Image_123", the top-N-list component 126 may store a sketch value and a contributor value in association with this contributor ID. In some instances, the top-N-list component 126 may determine the sketch value to be the minimum sketch value associated with the contributor ID from the probabilistic data structure 130 as described above (e.g., five), while determining the contributor value for the contributor ID to be the lesser of: (i) the sketch value of the new contributor ID, or (ii) the estimated cumulative value of the now-removed contributor plus the current value associated with the new contributor ID (here, five). Finally, after updating the top-N list to include the new contributor ID and its corresponding sketch value and contributor vale, the top-N-list component 126 may determine whether a new minimum sketch value associated with the top-N list 132 exists and, if so, may store an indication of the new minimum sketch value for the list 132.

FIG. 2, for instance, also illustrates an example top-N list 132. As illustrated, the top-N list 132 includes one or more contributor IDs 134, corresponding sketch values 136, and corresponding contributor values 138. The illustrated example list, for instance, indicates that the top contributors for this example metric are DEF (having a sketch value of 56 and an estimated cumulative value, or "contributor value", of 56), XYZ (having a sketch value of 43 and an estimated cumulative value, or "contributor value", of 43), and QRS (having a sketch value of 37 and an estimated cumulative value, or "contributor value", of 32).

At any time, the customer 106 may request, via customer device 106, one or more metrics from the metrics service 114. Upon receiving a request for information regarding top contributors for a particular metric, the top-contributors reporting component 128 may read data from the appropriate top-N list 132 and may report out the corresponding contributor IDs and contributor values to the customer computing device 108. For example, the top-contributors reporting component 128 may generate the GUI 116 using the appropriate top-N list 132 specifying the contributor IDs 134 and corresponding contributor values 138.

In addition to the above, the metrics service 114 may further store the cardinality-estimation component 122, which may function to maintain a number of unique contributors for unbounded data sets (for example) and report out this information to customers upon receiving corresponding requests. As illustrated, the cardinality-estimation component 122 includes a counter-selection component 140 and a counter-reporting component 142. The counter-selection component 140 may determine which of one or more data structures to store information associated with a unique contributor associated with a particular metric. The count-reporting component 142, meanwhile, functions to determine which data structure from which to read data for reporting to customers that request data.

In some instance, the counter-selection component 140 selects one or more of three (for example) data structures in which to store information associated with a contributor ID, such as a first counter 144, a second counter 146, and a third counter 148. Each of the three or other number of counters may comprise an exact counter (e.g., that maintains a precise or exact value of a metric) or a probabilistic counter (e.g., that maintains an approximation of the value of the metric. For example, the first counter 144 may comprise an exact counter (e.g., a hash-table counter), while the second counter 146 may comprise a first probabilistic counter (e.g., a linear counter) and the third counter 148 may comprise a second probabilistic counter (e.g., a HyperLogLog counter). In some instances, the first counter 144 is the most accurate counter, but requires the most amount of memory space, while the second counter 146 is probabilistic but generally accurate for moderately sized data sets, and the third counter 148 is also probabilistic and generally best used for large data sets.

In some instance, for example, the counter-selection component 140 may utilize the first counter 144 for data sets having a number of unique contributors that is smaller than a first threshold, the second counter 146 for data sets having a number of unique contributors that is greater than the first threshold but smaller than a second threshold, and the third counter 148 for data sets having a number of unique contributors that is greater than the second threshold.

For example, upon receiving data indicating that a contributor ID associated with a particular metric, the counter-selection component 140 may initially query the first counter 144 to determine whether it is saturated (or full). If not, then the counter-selection component 140 may store data associated with this contributor ID in the first counter 144, which may include storing data associated with this unique contributor ID (e.g., a hash value of the ID, the contributor ID itself, etc.). If, however, the first counter has already stored this contributor ID, then the counter-selection component 140 may update the counter to indicate that this contributor ID has been seen again.

In addition to storing data in the first counter 144, the counter-selection component 140 may determine whether the second counter 146 is saturated. If not, then the counter-selection component 140 may store data associated with the contributor ID in the second counter 146, which may comprise a data structure that maintains a count of unique contributors. The counter-selection component 140 may then additionally store data updating a count maintained by the third counter 148, which may maintain an estimated count of unique contributors. Further, if the counter-selection component 140 determines that the second counter 146 was saturated, the counter-selection component 140 may update the third counter 148.

If, however, the first counter is saturated, then the counter-selection component 140 may determine whether the second counter 146 is saturated. If not, then the counter-selection component 140 may update the second counter 146, as well as the third counter 148. If, however, the second counter 146 is saturated, then the counter-selection component 140 may update the third counter 148.

It is further noted that the first counter 144 may saturate after a first "N" number of unique contributor IDs are received (where "N" represents a maximum storage size of the first counter 144) while the second counter 146 will saturate after a first "M" number of unique contributors are received (where "M" represents a maximum storage size of the second counter 146 and M>N). Finally, after receiving "M" unique contributors, the counter-selection component 140 will update the third counter 148 without updating the first counter 144 or the second counter 146. Further, given that the first counter 144 is able to maintain the names of the contributor IDs and their respective counts, while the second counter 146 maintains the number of unique contributor IDs, and the third counter 148 is able to maintain an estimated number of unique contributor IDs, the counter-selection component 140 maintains more accurate data for smaller data sets than moderate and large data sets, moderately accurately data for moderately sized data sets, and less accurate, probabilistic data for large data sets. Thus, the counter-selection component 140 balances data accuracy with computational efficiency.

In addition to storing the data as described above, the counter-reporting component 142 may enable customers to query the stored data accordingly. For example, if a customer uses a device to request data regarding a number of unique contributors for a particular metric, the counter-reporting component 142 may initially query the first counter 144 to determine if it is saturated. If not, the counter-reporting component 142 may read the requested data from the first counter 144 and provide this data to the requesting device. Again, this data may comprise the names of the unique contributor IDs and their respective counts or, in some instances, may comprise the number of unique contributor IDs.

If, however, the first counter 144 is saturated, then the counter-reporting component 142 may determine whether the second counter 146 is saturated. If not, then the counter-reporting component 142 may read the requested data from the second counter 146 and provide this data to the requesting device. Again, this data may comprise the number of unique contributor IDs. Finally, if the second counter 146 is saturated, then the counter-reporting component 142 may read the data from the third counter 148 and may provide this data representing the estimated number of unique contributor IDs to the requesting device. By utilizing this multi-tiered data structure approach, the counter-selection component 140 and the counter-reporting component 142 thus enables extremely high accuracy for smaller data sets and less, but still high, accuracy for very large unbounded data sets. Thus, the metrics service 114 is able to store and report data in a computationally efficient and still accurate manner across varying sizes of unbounded data sets, both small and extremely large.

As discussed below with reference to FIG. 10, the computing resources 104 of the service provider network 102 may include one or more hardware processors (processors) configured to execute one or more stored instructions. The processor(s) may comprise one or more cores. Further, the service provider network 102 may include one or more network interfaces configured to provide communications between the service provider network 102 and other devices, such as the customer device(s) 108, user device(s) 112, other computing devices, and/or other systems or devices in the service provider network 102 and/or remote from the service provider network 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi, and so forth.

The service provider network 102 may also include computer-readable media that stores various executable components (e.g., software-based components, firmware-based components, etc.). In addition to various components discussed in FIG. 1, the computer-readable-media may further store components to implement functionality described herein. While not illustrated, the computer-readable media may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider network 102 may include multiple additional data stores which may comprise repositories or other storage locations for persistently storing and managing collections of data such as databases, simple files, binary, and/or any other data. The data store(s) may include one or more storage locations that may be managed by one or more database management systems.

The computer-readable media may store portions, or components, of the metrics service 114 described herein. In addition, the computer-readable media may further store the user portal(s) through which customers 106 can provide input via their user accounts and user devices 108. In some examples, the user portal(s) include an interface through which users 106 can request and receive the described metrics data. The computer-readable media may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

FIGS. 3, 4A-B, 5, 6, 7A-B, and 8A-B illustrate flow diagrams of example processes 300, 400, 500, 600, 700, and 800 that illustrate aspects of the functions performed at least partly by the service provider network 102 as described in this disclosure. The logical operations described herein with respect to these processes may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in processes described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 3:
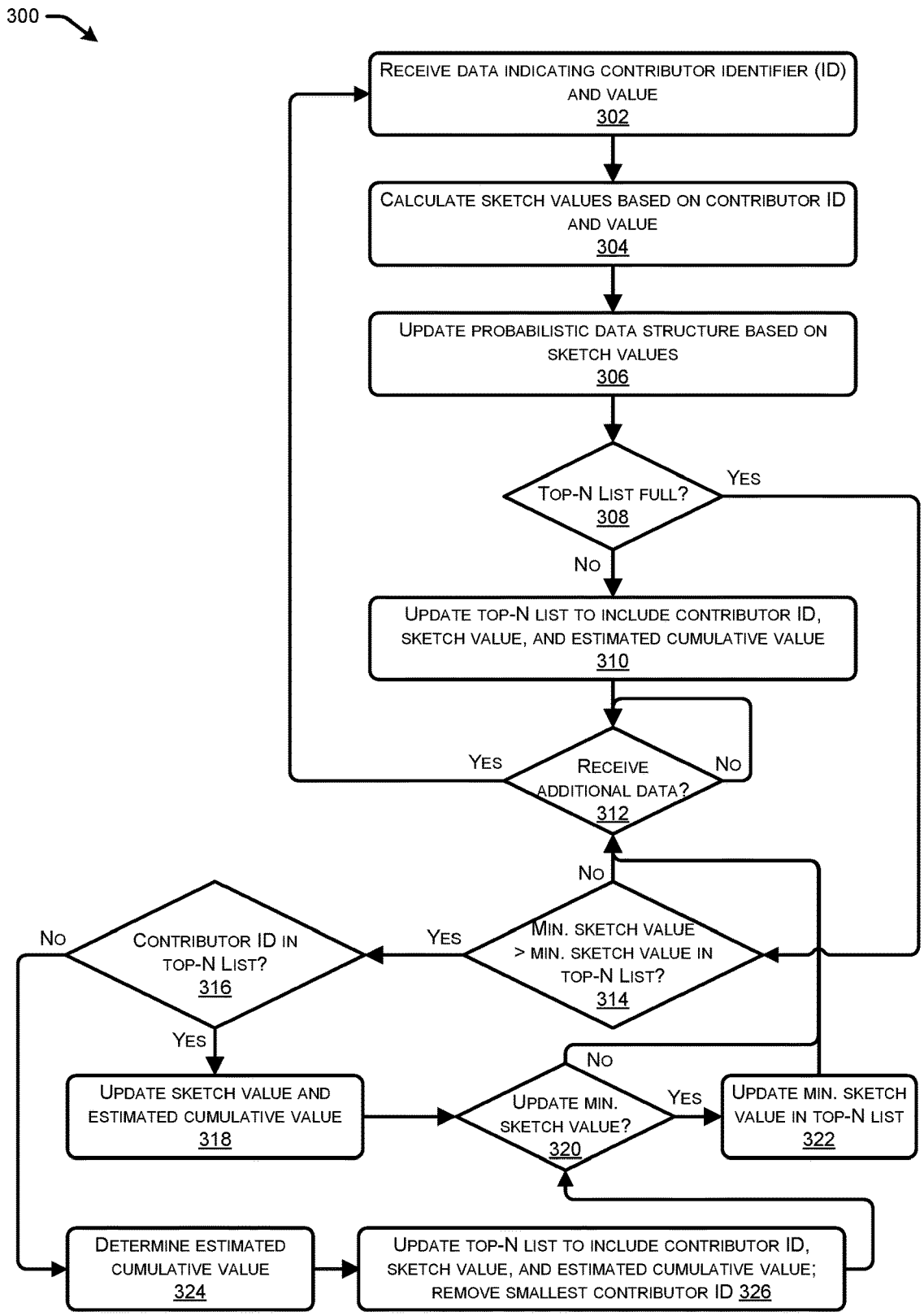
FIG. 3 illustrates a flow diagram of an example process for utilizing a probabilistic data structure to identify a set of largest contributors associated with a particular metric, and a top-N list to maintain a value associated with each of these largest contributors.

FIG. 3 illustrates a flow diagram of an example process 300 for utilizing a probabilistic data structure to identify a set of largest contributors associated with a particular metric, and a top-N list to maintain a value associated with each of these largest contributors. In some instances, the metrics service 114 implements some or all of the operations of the process 300.

At 302, the metrics service 114 may receive data indicating a contributor ID and an associated value. For example, the data may indicate that a particular entity was associated with a particular number of instances, such as a particular file being accessed a certain number of times, a particular process causing a failure a particular number of times, users from a particular region accessing a service a certain number of times, and/or any other metric associated with any other entity.

At 304, the metrics service 114 may calculate one or more sketch values using a probabilistic data structure and based on the contributor ID and value. Using a count-min-sketch data structure as an example, for instance, the metrics service may use the contributor ID and hash functions associated with respective columns of the data structure to determine which cells within the respective columns the contributor ID maps to. The metrics service may then increase a counter of each of the cells by the current value (determined at the operation 302) to determine the sketch values.

At 306, the metrics service may update the probabilistic data structure based on the sketch values determined at 304. For example, the metrics service may update the count-min-sketch data structure to indicate the new sketch values at the cells whose counters were updated at 304.

At 308, the metrics service determines whether the top-N list of contributors is full. That is, the metrics service may determine whether there are currently N contributor IDs included in the top-N list. If not, then at 310 the metrics service may update the top-N list to include the contributor ID and its corresponding sketch value and corresponding estimated cumulative value. In some instances, the sketch value may comprise the minimum or smallest sketch value of the sketch values determined by the contributor ID at 304. Further, in this instance the estimated cumulative value may comprise the value determined at 302. The process 300 may then proceed to 312 to await receipt of additional data.

If, however, the top-N list is full, the process 300 proceeds to determine, at 314, whether the minimum or smallest sketch value of the sketch values associated with the contributor ID (and determined at 304) is greater than a current minimum sketch value associated with a contributor ID included in the top-N list. If not, then the metrics service refrains from updating the top-N list and, rather, awaits the receipt of additional data at 312.

If, however, the smallest sketch value determined at 304 is greater than the minimum sketch value associated with the top-N list, then at 316 the metrics service determines whether the contributor ID is already represented in the top-N list. If so, then at 318 the metrics service may update the sketch value and estimated cumulative value associated with the contributor ID in the top-N list. For instance, the metrics service may replace the previous sketch value associated with the contributor ID in the top-N list with the minimum sketch value associated with the contributor ID determined at 304. Further, the metrics service may increase the estimated cumulative value of the contributor ID in the top-N list by the value represented by the data at 302. At 320, the metrics service may then determine whether to update the minimum sketch value associated with the top-N list. For instance, the metrics service may determine whether the minimum sketch value associated with the list has changed and, if so, may update the minimum sketch value at 322. After doing so, or if the metrics service determines that the minimum sketch value has not changed, then the metrics service may await additional data at 312.

If, however, the top-N list does not include the contributor ID, then at 324 the metrics service may determine an estimated cumulative value associated with the contributor ID. For example, the metrics service may determine that the estimated cumulative value for the contributor ID comprises the lesser of: (i) the minimum sketch value of the sketch values associated with the contributor ID determined at 304, or (ii) the smallest estimated cumulative value associated with a contributor ID in the top-N list (i.e., the estimated frequency count of the last of the N listed contributor IDs in the top-N list) plus the current value associated with the new contributor ID (indicated by the data at 302). At 326, the metrics service may update the top-N list by adding the contributor ID to the list along with its sketch value (e.g., the minimum sketch value of the sketch values associated with the contributor ID determined at 304) and its estimated cumulative value. In addition, the metrics service may remove the contributor ID that was previously associated with the smallest estimated cumulative value in the top-N list. The metrics service may then determine whether to update the minimum sketch value at 320 and, thereafter, may await receipt of additional data at 312.

Figure 4A:
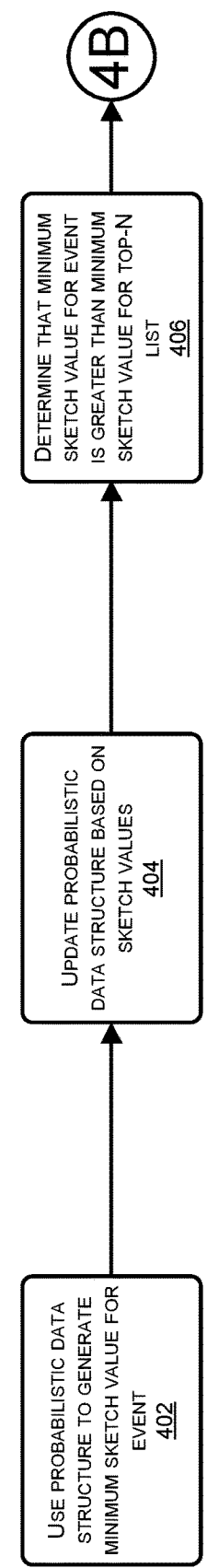
FIGS. 4A-B collectively illustrate an example sequence of operations in which the metrics service of FIG. 1 utilizes a count-min-sketch or other probabilistic data structure to identify which contributors are the largest contributors for a particular metric and a top-N list to maintain an estimated cumulative value associated with each of these identified contributors.
Figure 4B:
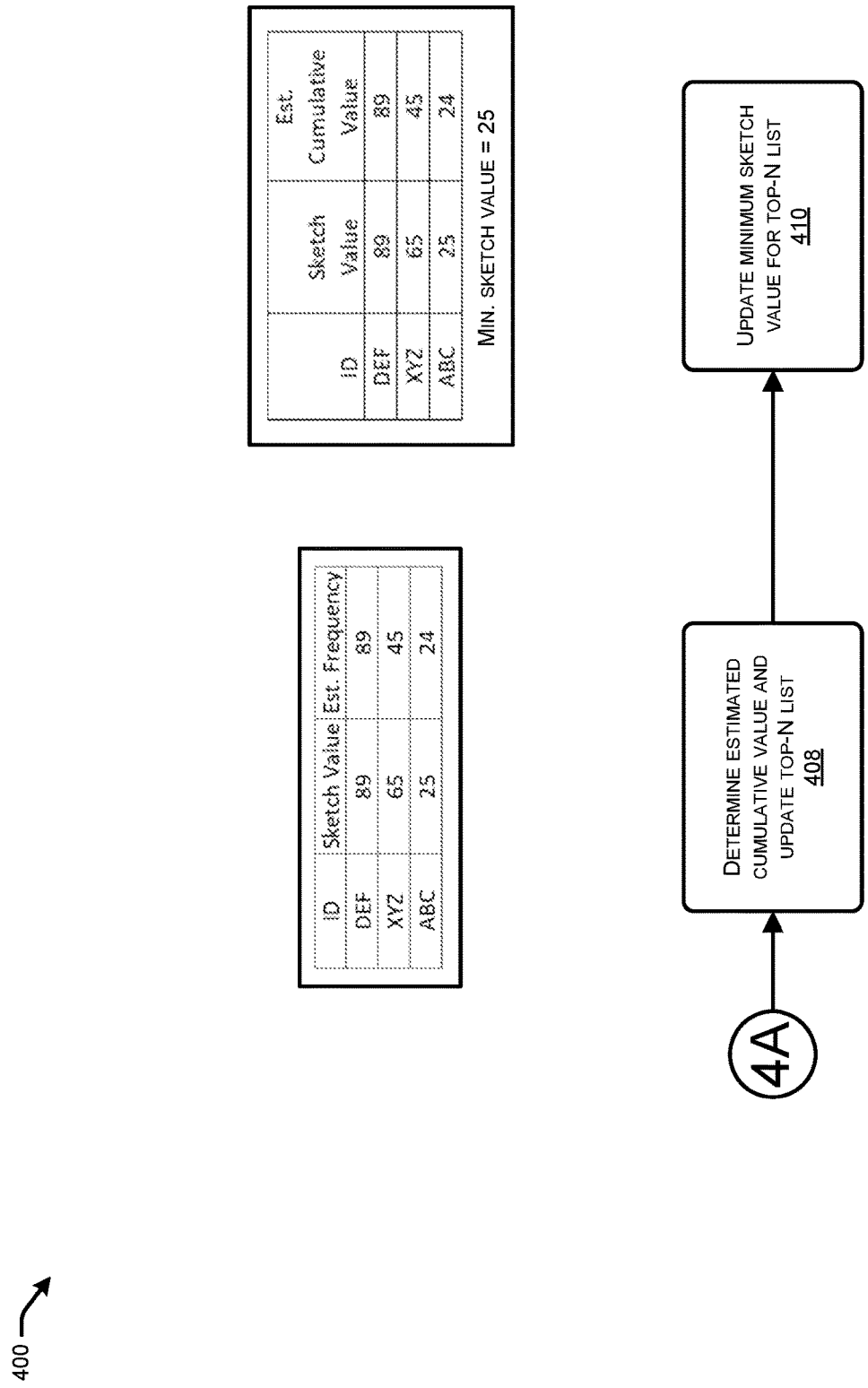

FIGS. 4A-B collectively illustrate an example sequence of operations 400 in which the metrics service of FIG. 1 utilizes a count-min-sketch or other probabilistic data structure to identify which contributors are the largest contributors for a particular metric and a top-N list to maintain an estimated cumulative value associated with each of these identified contributors.

At 402, the probabilistic-data-structure algorithm 124 may use the probabilistic data structure 130 and event data indicating a contributor ID and value to determine a minimum sketch value. For example, in the illustrated example, the probabilistic-data-structure algorithm 124 may receive data indicating that a contributor ID of "Contributor_ABC" has been deemed responsible for a value of five. The probabilistic-data-structure algorithm 124 may use the hash functions associated with the illustrated count-min-sketch probabilistic data structure to determine which cells the contributor ID maps to. In this example, "Contributor_ABC" is determined to map to the third cell (or row) in the first column, the second cell in the second column, and the third cell in the third column. As illustrated, before receipt of the data, the value of these cells in the count-min-sketch are, respectively, 25, 28, and 20. Thus, adding the value of five to these sketch values results in sketch values of 30, 33, and 25, respectively. The probabilistic-data-structure algorithm 124 thus determines, at 402, that the received event data is associated with a minimum sketch value of 25.

At 404, the probabilistic-data-structure algorithm 124 may update the probabilistic data structure 130 to indicate the new sketch values. For example, the counters of the respective cells have been updated to 30, 33, and 28, respectively.

At 406, the probabilistic-data-structure algorithm 124 or the top-N-list component 126 determines that the minimum sketch value determined at 402 is greater than a current minimum sketch value associated with a top-N list 132. As illustrated, the top-N list includes three the following three entries: (i) DEF with a sketch value of 89 and an estimated cumulative value of 89; (ii) XYZ with a sketch value of 65 and an estimated cumulative value of 45, and (iii) QRS with a sketch value of 19 and an estimated cumulative value of 19. As illustrated, the sketch value determined at 402 (25) is greater than the current minimum sketch value associated with the top-N list.

FIG. 4B continues the illustration and includes, at 408, the probabilistic-data-structure algorithm 124 or the top-N-list component 126 determining an estimated cumulative value to associate with the contributor ID "ABC" and updating the top-N list accordingly. As noted above, the estimated cumulative value may comprise the lesser of: (i) the minimum sketch value associated with the contributor ID "ABC" determined at 402 (25), or (ii)) the smallest estimated cumulative value associated with a contributor ID in the top-N plus the current value (19 and 5 respectively, for a total of 24). Given that the latter (24) is smaller than the former (25), the top-N list component 126 updates the top-N list 132 to indicate that the contributor "ABC" is associated with a sketch value of 25 and an estimated cumulative value of 24. Further, the top-N-list component 126 may remove the contributor QRS from the list, given that it has now "fallen out" of the top N.

Finally, at 410, the probabilistic-data-structure algorithm 124 or the top-N-list component 126 may update the minimum sketch value associated with the top-N list 132. As illustrated, the minimum sketch value has been updated from a value of 19 to a value of 25.

Figure 5:
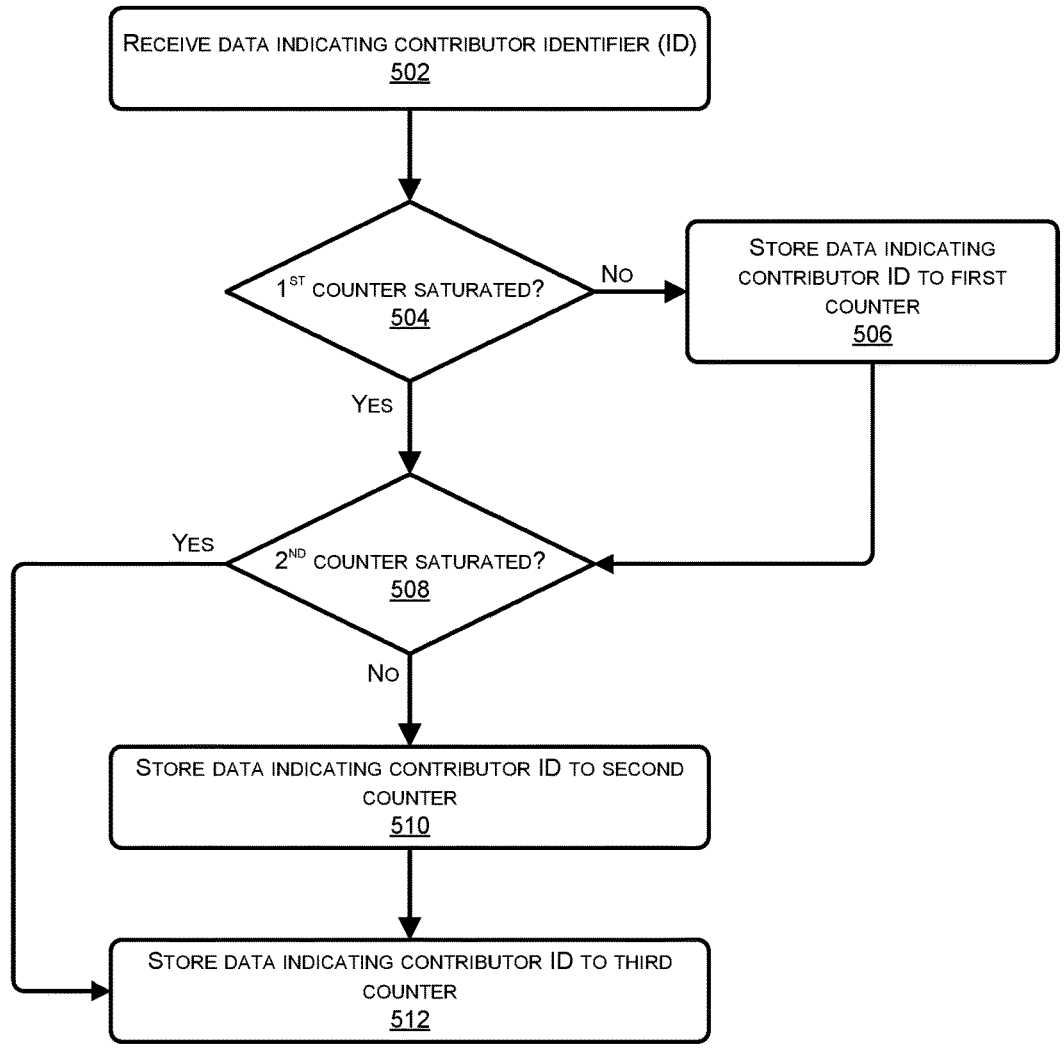
FIG. 5 illustrates a flow diagram of an additional example process that the metrics service of FIG. 1 may perform for maintaining a value of unique contributors associated with a large, unbounded data set in a computationally efficient manner. As illustrated, the metrics service may store data associated with each unique contributor in one or more of a hash-table data structure, a linear-counter data structure, and a probabilistic data structure, such that information associated with relatively small data sets are stored with a high degree of accuracy and much larger data sets are stored with less, but sufficient, accuracy in a computationally efficient, non-wasteful manner.

FIG. 5 illustrates a flow diagram of an additional example process 500 that the counter-selection component 140 of the cardinality-estimation component 122 may perform for maintaining a value (e.g., a count) associated with unique contributors associated with a large, unbounded data set in a computationally efficient manner. As illustrated, the metrics service 114 may store data associated with each unique contributor in one or more of a first counter (e.g., an exact counter such as a hash-table data structure), a second counter (e.g., a probabilistic counter such as a linear-counter data structure), and a third counter (e.g., a probabilistic counter such as a probabilistic data structure, such that information associated with relatively small data sets are stored with a high degree of accuracy and much larger data sets are stored with less, but sufficient, accuracy in a computationally efficient, non-wasteful manner.

At 502, the counter-selection component 140 may receive data indicating that a contributor ID has been identified. For example, this may indicate that a particular file has been accessed, a particular user identifier has accessed a system, a particular error has been encountered, or the like.

At 504, the counter-selection component 140 determines whether the first counter 144 is saturated (or full). If not, then at 506 the counter-selection component 140 stores data associated with this contributor ID in the first counter. This may include storing data associated with this unique contributor ID (e.g., a hash value of the ID, the contributor ID itself, etc.). If, however, the first counter has already stored this contributor ID, then the metrics service may update a counter to indicate that this contributor ID has been seen again.

In addition to storing data in the first counter 144, the counter-selection component 140 may determine whether the second counter 146 is saturated. If not, then the counter-selection component 140 may store data associated with the contributor ID in the second counter 146 as well, which may comprise a data structure that maintains a count of unique contributors. The counter-selection component 140 may then additionally store data updating a count maintained by a third counter, such as a probabilistic counter that maintains an estimated count of unique contributors. Further, if the counter-selection component 140 determines that the second counter was saturated, the metrics service may update the third counter.

If, however, the first counter is saturated, then the counter-selection component 140 may determine whether the second counter 146 is saturated. If not, then the counter-selection component 140 may update the second counter 146, as well as the third counter 148. If, however, the second counter 146 is saturated, then the counter-selection component 140 may update the third counter 148.

Figure 6:
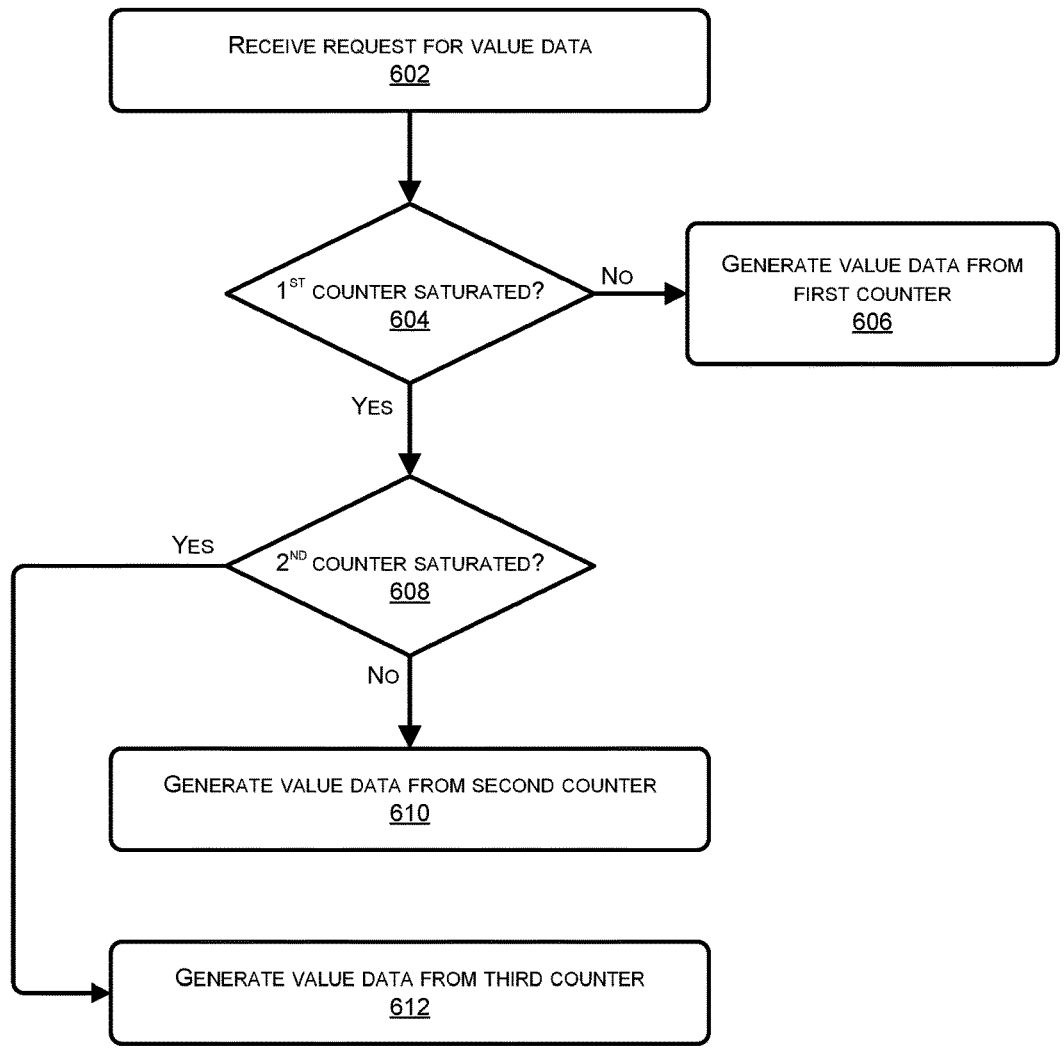
FIG. 6 illustrates a flow diagram of an example process that the metrics service may utilize when a customer requests information associated with a data set whose data was stored according to the process of FIG. 5. As illustrated, the metrics service may retrieve the requested information from the hash-table data structure for relatively small data sets, from the linear-counter data structure for moderately sized data sets, and the probabilistic data structure for large data sets.

FIG. 6 illustrates a flow diagram of an example process 600 that the counter-reporting component 142 of the cardinality-estimation component 122 may utilize when a customer requests information associated with a data set whose data was stored according to the process 500. As illustrated, the metrics service may retrieve the requested information from the first counter 144 (e.g., an exact counter) for relatively small data sets, from the second counter 146 (e.g., another exact counter or a probabilistic counter, such as a linear counter) for moderately sized data sets, and the third counter 148 (e.g., a probabilistic data structure, such as a HyperLogLog counter) for large data sets.

At 602, the counter-reporting component 142 receives a request for value data. For example, a customer 106 may use a customer device 108 to request data regarding a number of unique contributors for a particular metric or a request for data associated with any other type of value stored in association with one or more contributor IDs.

At 604, the counter-reporting component 142 may initially query the first counter 144 to determine if this counter is saturated. If not, then at 606 the counter-reporting component 142 may generate the requested data from the first counter 144. Again, this data may comprise the names of the unique contributor IDs and their respective counts or, in some instances, may comprise the number of unique contributor IDs.

If, however, the first counter 144 is saturated, then at 608 the counter-reporting component 142 may determine whether the second counter 146 is saturated. If not, then the counter-reporting component 142 may generate the requested data from the second counter 146 at 610. Again, this data may comprise the number of unique contributor IDs. Finally, if the second counter 146 is saturated, then the counter-reporting component 142 may generate the requested data from the third counter 148 at 612. After generating the requested metric data at one of 606, 610, or 612, the metrics service 114 may report this data to the requesting device.

Figure 7A:
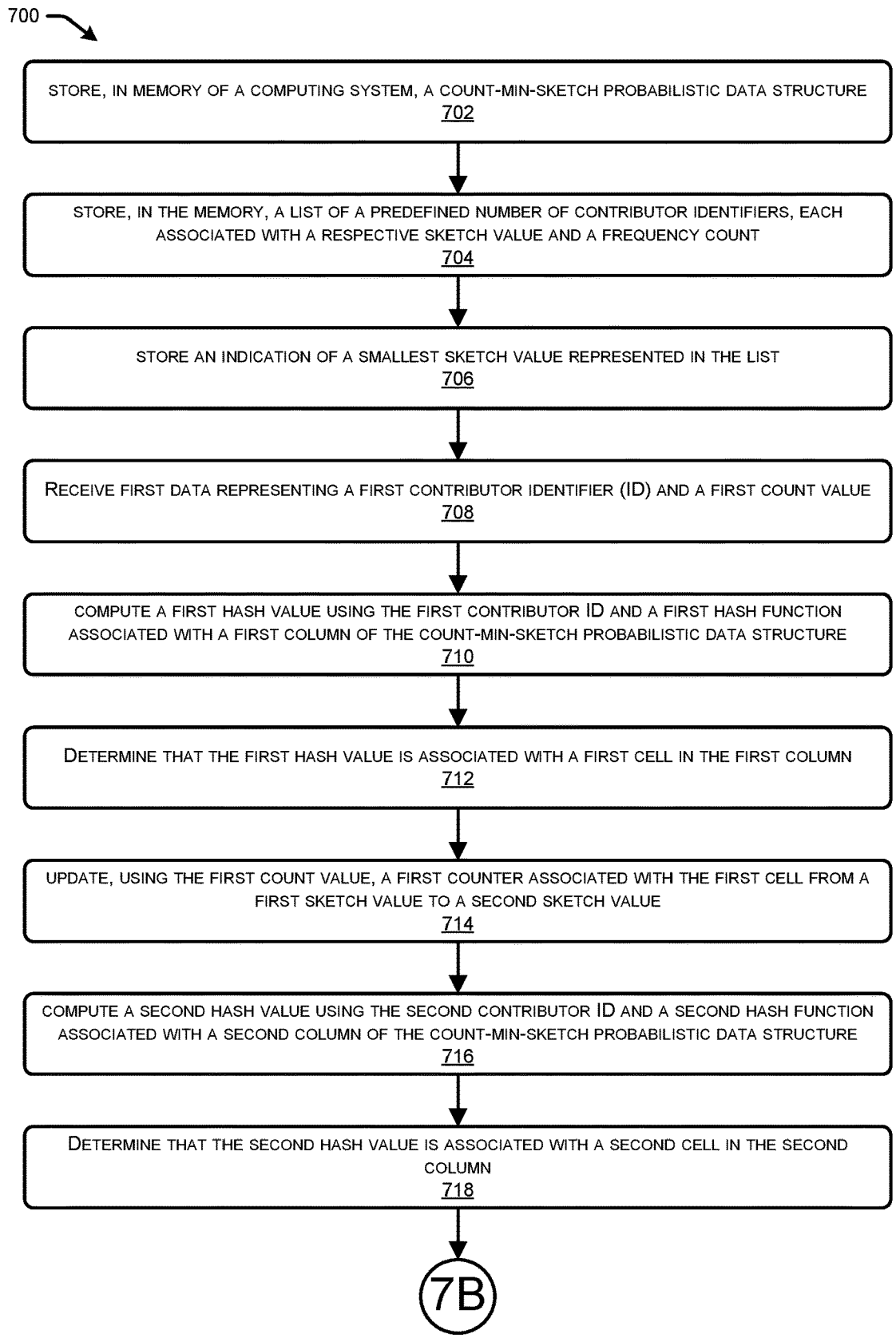

FIGS. 7A-B collectively illustrate a flow diagram of an example process 700 for using both a probabilistic data structure and a top-N-list data structure for maintaining metrics information in a computationally efficient manner. The metrics service 114 of the service provider network 102 may perform some or all of the operations in some instances.

At 702, the probabilistic-data-structure algorithm 124 may store, in memory of a computing system, a count-min-sketch probabilistic data structure. At 704, the top-N-list component 126 may store, in the memory of the computing system, a list of a predefined number of contributor identifiers, each contributor identifier associated with a respective sketch value and a respective cumulative value. In addition, at 706, the top-N-list algorithm 124 may store an indication of a smallest sketch value represented in the list.

At 708, the metrics service 114 may receive first data representing a first contributor identifier and a first value. At 710, the probabilistic-data-structure algorithm 124 may compute a first hash value using the first contributor identifier and a first hash function associated with a first column of the count-min-sketch probabilistic data structure and, at 712, may determine that the first hash value is associated with a first cell in the first column. Thereafter, at 714, the probabilistic-data-structure algorithm 124 may update, using the first value, a first counter associated with the first cell from a first sketch value to a second sketch value.

Similarly, at 716, the probabilistic-data-structure algorithm 124 may compute a second hash value using the first contributor identifier and a second hash function associated with a second column of the count-min-sketch probabilistic data structure. At 718, the probabilistic-data-structure algorithm 124 may determine that the second hash value is associated with a second cell in the second column.

FIG. 7B continues the illustration of the process 700 and includes, at 720, the probabilistic-data-structure algorithm 124 updating, using the first value, a second counter associated with the second cell from a third sketch value to a fourth sketch value. At 722, the probabilistic-data-structure algorithm 124 determines that the second sketch value is a minimum value from a set of values that includes at least the second sketch value and the fourth sketch value. At 724, the probabilistic-data-structure algorithm 124 or the top-N-list component 126 determines that the second sketch value is greater than the smallest sketch value represented in the list.

At 726, the top-N-list component 126 may delete, from the list, a second contributor identifier associated with the smallest sketch value and store, at 728, the first contributor identifier in the list. In addition, at 730, the top-N-list component 126 may store, in the list, the second sketch value in association with the first contributor identifier. At 732, the top-N-list component 126 may also determine, and store in the list, a first cumulative value in association with the first contributor identifier. In some instances, the first cumulative value comprising an estimation of a number of occurrences of the first contributor identifier, while in other instances the value may comprise any other metric, such as size, time, or the like. In some instances, the first cumulative value may comprise a lesser of: (i) the second sketch value, and (ii) a cumulative value associated with the second contributor identifier plus the first value.

Figure 8A:
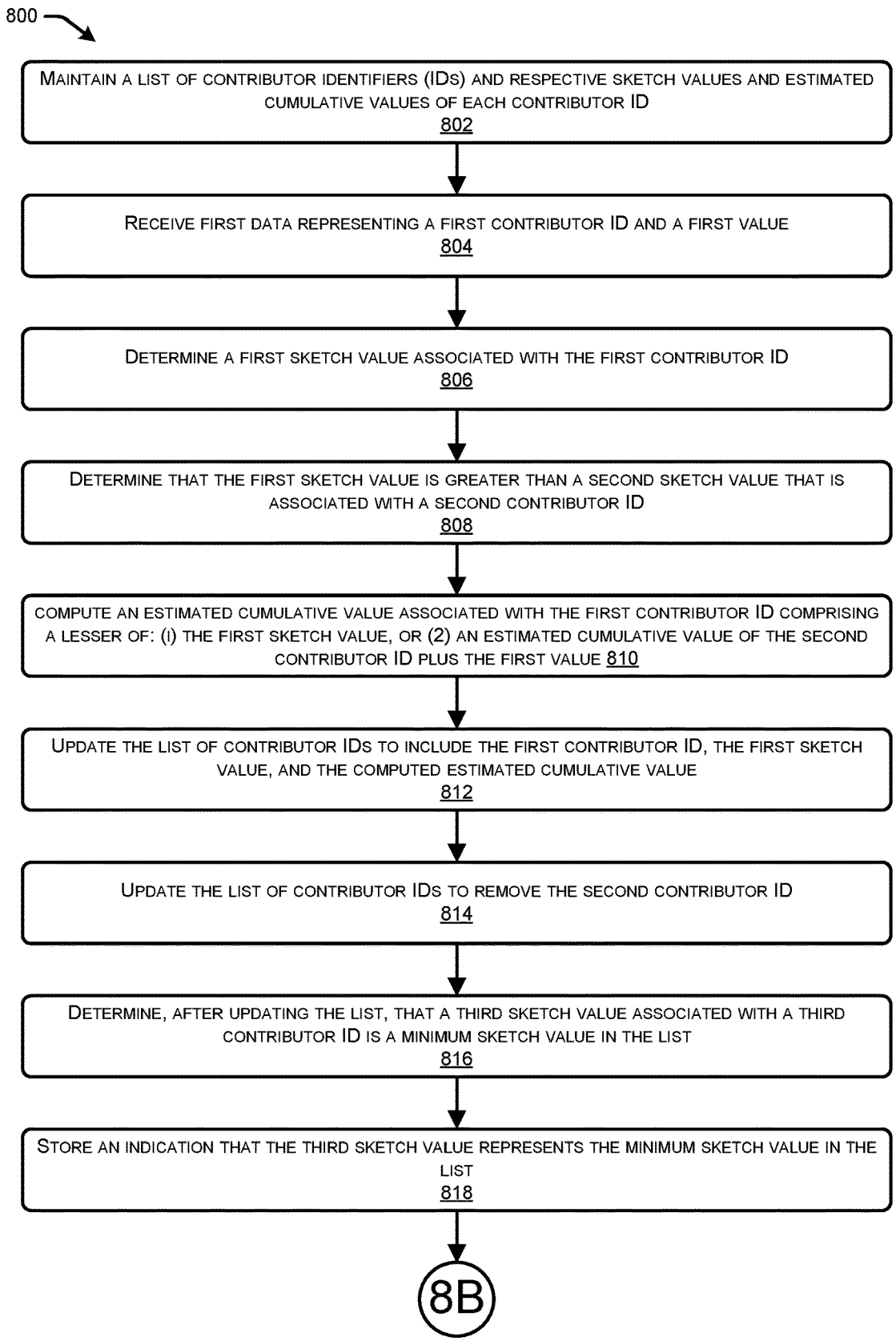
FIGS. 8A-B collectively illustrate a flow diagram of another example process for using both a probabilistic data structure and a top-N-list data structure for maintaining metrics information in a computationally efficient manner.
Figure 8B:
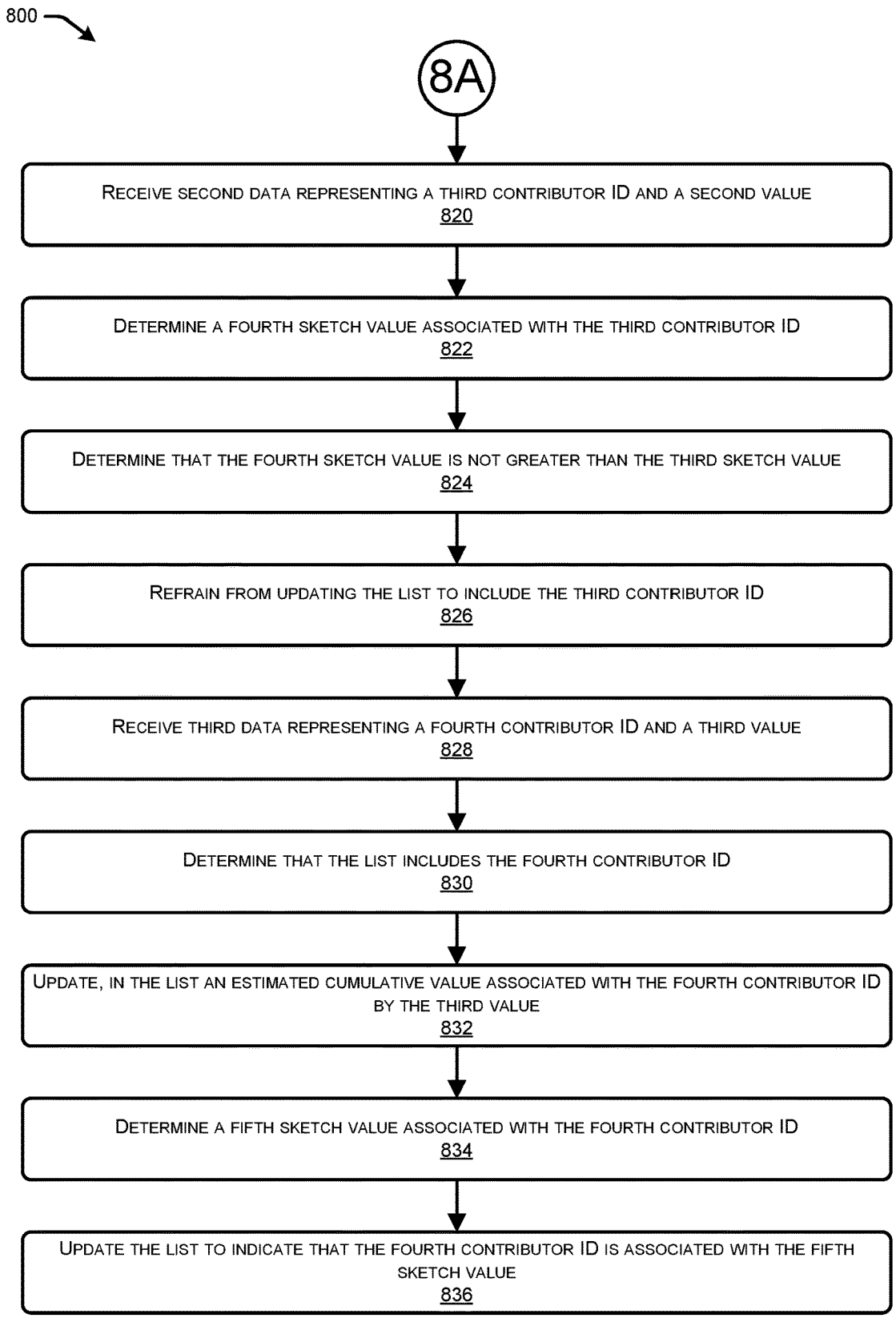

FIGS. 8A-B collectively illustrate a flow diagram of another example process 800 for using both a probabilistic data structure and a top-N-list data structure for maintaining metrics information in a computationally efficient manner. The metrics service 114 of the service provider network 102 may perform some or all of the operations in some instances.

At 802, the metrics service 114 may maintaining a list of contributor identifiers, the list further including a respective sketch value associated with each contributor identifier of the list of contributor identifiers. At 804, the metrics service 114 may receive first data representing a first contributor identifier and a first value. At 806, the probabilistic-data-structure algorithm 124 may determine, based at least in part on the first value and using a probabilistic data structure, a first sketch value associated with the first contributor identifier and, at 808, the probabilistic-data-structure algorithm 124 or the top-N-list component 126 may determine that the first sketch value is greater than a second sketch value associated with a second contributor identifier.

At 810, the top-N-list component 126 may compute an estimated cumulative value associated with the first contributor identifier, the estimated cumulative value associated with the first contributor identifier comprising a lesser of: (i) the first sketch value, and (ii) an estimated cumulative value associated with the second contributor identifier plus the first value. At 812, the top-N-list component 126 may update the list of contributor identifiers to include the first contributor identifier and the estimated cumulative value associated with the first contributor identifier. At 814, the top-N-list component may update the list to remove the second contributor identifier.

At 816, the probabilistic-data-structure algorithm 124 may determine, after the updating of the list, that a third sketch value associated with a third contributor identifier is a minimum sketch value represented in the list. At 818, the probabilistic-data-structure algorithm 124 may store an indication that the third sketch value represents the minimum sketch value.

FIG. 8B continues the illustration of the process 800 and includes, at 820, the metrics service 114 receiving second data representing a third contributor identifier and a second value. At 822, the probabilistic-data-structure algorithm 124 may determine, based at least in part on the second value and using the probabilistic data structure, a fourth sketch value associated with the third contributor identifier. At 824, the probabilistic-data-structure algorithm 124 or the top-N-list component 126 may determine that the fourth sketch value is not greater than the third sketch value and, at 826, may refrain from updating the list to include the third contributor identifier.

At 828, the metrics service 114 may receive third data representing a fourth contributor identifier and a third value. At 830, the top-N-list component 126 may determine that the list includes the fourth contributor identifier and, at 832, may update, in the list, an estimated cumulative value associated with the fourth contributor value by the third value. At 834, the top-N-list component 126 may determine, based at least in part on the third value and using the probabilistic data structure, a fifth sketch value associated with the fourth contributor identifier and, at 836, may update the list to indicate that the fourth contributor identifier is associated with the fifth sketch value.

Figure 9:
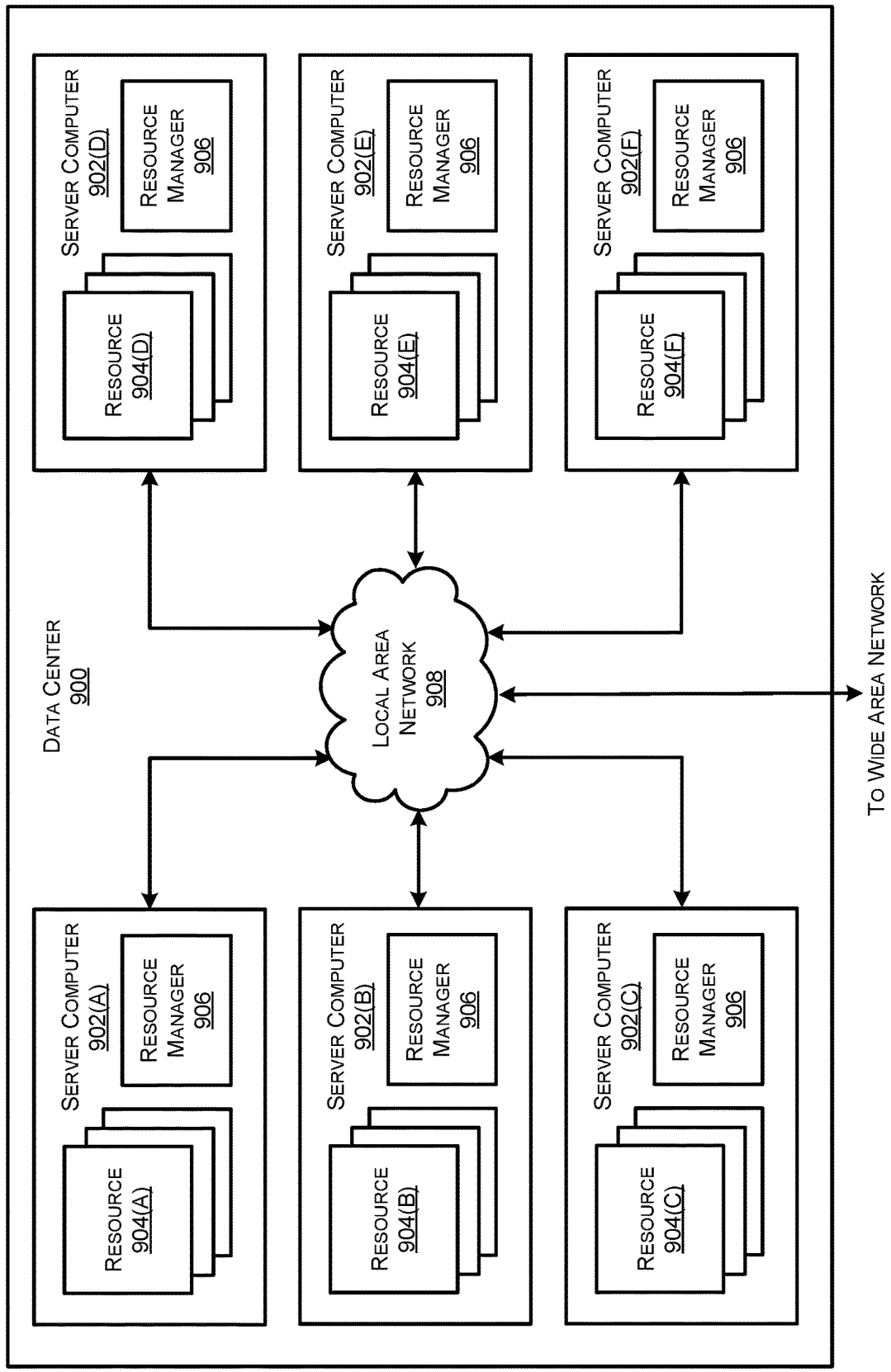
FIG. 9 is a computing system diagram illustrating a configuration for a data center that can be utilized to implement aspects of the technologies disclosed herein.

FIG. 9 is a computing system diagram that illustrates one configuration for a data center 900 that may implement aspects of the technologies disclosed herein. The example data center 900 shown in FIG. 9 includes several server computers 902A-902F (which might be referred to herein singularly as "a server computer 902" or in the plural as "the server computers 902") for providing computing resources 904A-904E. In some examples, the resources 904 and/or server computers 902 may include, be included in, or correspond to, the computing resources 104 described herein.

The server computers 902 can be standard tower, rack-mount, or blade server computers configured appropriately for providing the computing resources described herein. As mentioned above, the computing resources provided by the service provider network 102 can be data processing resources such as VM instances or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of VM instances, for example, the resource manager 906 can be a hypervisor or another type of program configured to enable the execution of multiple VM instances on a single server computer 902. Server computers 902 in the data center 900 can also be configured to provide network services and other types of services.

In the example data center 900 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of multiple data centers, between each of the server computers 902A-902F in each data center 900, and, potentially, between computing resources in each of the server computers 902. It should be appreciated that the configuration of the data center 900 described with reference to FIG. 9 is merely illustrative and that other implementations can be utilized.

One or more of the server computers 902 shown in the example data center may be configured to execute some or all of the software components described above. For example, and without limitation, the server computers 902 can be configured to execute the components of the metrics service 114 and/or the other software components described above. The server computers 902 can also be configured to execute other components and/or to store data for providing some or all of the functionality described herein.

Figure 10:
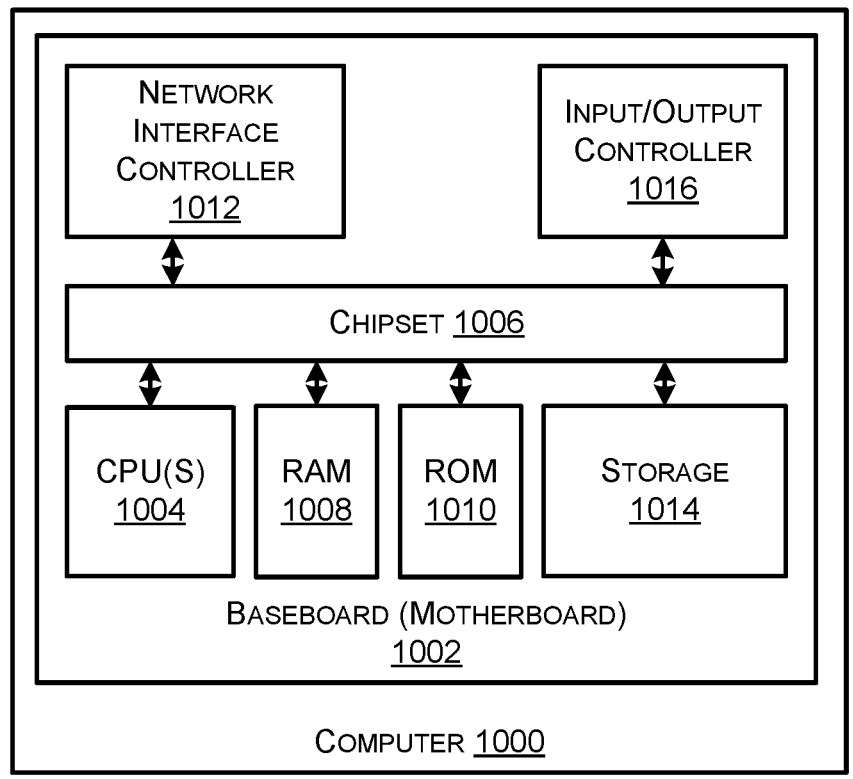
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein. In some examples, the server computer 1000 may correspond to, or be the same as or similar to, each computing device described in FIG. 1.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 118. The chipset 1006 can include functionality for providing network connectivity through a network interface controller (NIC) 1012, such as a gigabit Ethernet adapter. The NIC 1012 is capable of connecting the computer 1000 to other computing devices over the network 118. It should be appreciated that multiple NICs 1012 can be present in the computer 1000, connecting the computer to other types of networks and remote computer systems.

The computer 1000 can include storage 1014 (e.g., disk) that provides non-volatile storage for the computer. The storage 1014 can consist of one or more physical storage units. The storage 1014 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the storage 1014 by detecting the physical states or characteristics of one or more particular locations within the physical storage units.

In addition to the storage 1014 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 102, and or any components included therein, may be supported by one or more devices similar to computer 1000. Stated otherwise, some or all of the operations performed by the service provider network 102, and or any components included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1014 can store an operating system utilized to control the operation of the computer 1000. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1014 can store other system or application programs and data utilized by the computer 1000.

In one embodiment, the storage 1014, RAM 1008, ROM 1010, and/or other computer-readable storage media may be encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various techniques described above. The computer 1000 can also include computer-readable storage media having instructions stored thereupon for performing any of the other computer-implemented operations described herein.

Generally, the computer 1000 may be an example of a computing device 112 (and other computing devices, servers, etc.) described herein. The CPU(s) 1004, RAM 1008, ROM 1010, storage 1014, bandwidth of the NIC 1012, and/or other resources of the computer 1000 may be allocated to one or more different VM instances 114 as described herein based on the VM instance types 130.

The computer 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a computing system, the method comprising:
   storing, in memory of the computing system, a count-min-sketch probabilistic data structure;
   storing, in the memory of the computing system, a list of a predefined number of contributor identifiers, each contributor identifier associated with a respective sketch value and a respective frequency count;
   storing an indication of a smallest sketch value represented in the list;
   receiving first data representing a first contributor identifier and a first count value;
   computing a first hash value using the first contributor identifier and a first hash function associated with a first column of the count-min-sketch probabilistic data structure;
   determining that the first hash value is associated with a first cell in the first column;
   updating, using the first count value, a first counter associated with the first cell from a first sketch value to a second sketch value;
   computing a second hash value using the first contributor identifier and a second hash function associated with a second column of the count-min-sketch probabilistic data structure;
   determining that the second hash value is associated with a second cell in the second column;
   updating, using the first count value, a second counter associated with the second cell from a third sketch value to a fourth sketch value;
   determining that the second sketch value is a minimum value from a set of values that includes at least the second sketch value and the fourth sketch value;
   determining that the second sketch value is greater than the smallest sketch value represented in the list;
   deleting, from the list, a second contributor identifier associated with the smallest sketch value; and
   storing, in the list, the first contributor identifier.

2. The method as recited in claim 1, further comprising:
   storing, in the list, the second sketch value in association with the first contributor identifier; and
   storing, in the list, a first frequency count in association with the first contributor identifier, the first frequency count comprising an estimation of a number of occurrences of the first contributor identifier.

3. The method as recited in claim 1, further comprising:
   storing, in the list, the second sketch value in association with the first contributor identifier; and
   storing, in the list, a first frequency count in association with the first contributor identifier, the first frequency count comprising a lesser of: (i) the second sketch value, and (ii) a frequency count associated with the second contributor identifier plus the first count value.

4. A system comprising:
   one or more processors; and
   one or more computer-readable media storing computer-executable instructions that, when executed, cause the one or more processors to perform acts comprising:
   receiving first data representing a first contributor identifier and a first value;
   determining, based at least in part on the first value and using a probabilistic data structure, a first sketch value associated with the first contributor identifier;
   determining that the first sketch value is greater than a second sketch value associated with a second contributor identifier;
   updating a list of contributor identifiers to include the first contributor identifier and an estimated cumulative value associated with the first contributor identifier; and
   updating the list of contributor identifiers to remove the second contributor identifier.

5. The system as recited in claim 4, wherein the one or more computer-readable media further store computer-executable instructions that, when executed, cause the one or more processors to perform an act comprising computing the estimated contributor value associated with the first contributor identifier, the estimated cumulative value associated with the first contributor identifier comprising a lesser of: (i)

the first sketch value, and (ii) an estimated cumulative value associated with the second contributor identifier plus the first value.

6. The system as recited in claim 4, wherein the determining the first sketch value comprises determining the first sketch value based at least in part on the first value and using a count-min-sketch probabilistic data structure.

7. The system as recited in claim 4, wherein the one or more computer-readable media further store computer-executable instructions that, when executed, cause the one or more processors to perform an act comprising maintaining the list of contributor identifiers, the list further including a respective sketch value associated with each contributor identifier of the list of contributor identifiers, and wherein the second sketch value comprises a minimum sketch value included in the list prior to the updating of the list.

8. The system as recited in claim 4, wherein the one or more computer-readable media further store computer-executable instructions that, when executed, cause the one or more processors to perform acts comprising:
receiving second data representing a third contributor identifier and a second value;
determining, based at least in part on the second value and using the probabilistic data structure, a third sketch value associated with the third contributor identifier;
determining that the third sketch value is not greater than the second sketch value; and
refraining from updating the list to include the third contributor identifier.

9. The system as recited in claim 4, wherein the one or more computer-readable media further store computer-executable instructions that, when executed, cause the one or more processors to perform acts comprising:
determining, after the updating of the list, that a third sketch value associated with a third contributor identifier is a minimum sketch value represented in the list;
storing an indication that the third sketch value represents the minimum sketch value.

10. The system as recited in claim 4, wherein the one or more computer-readable media further store computer-executable instructions that, when executed, cause the one or more processors to perform acts comprising:
receiving second data representing a third contributor identifier and a second value;
determining that the list includes the third contributor identifier; and
updating, in the list, an estimated cumulative value associated with the third contributor identifier by the second value.

11. The system as recited in claim 10, wherein the one or more computer-readable media further store computer-executable instructions that, when executed, cause the one or more processors to perform acts comprising:
determining, based at least in part on the second value and using the probabilistic data structure, a third sketch value associated with the third contributor identifier; and
updating the list to indicate that the third contributor identifier is associated with the third sketch value.

12. The system as recited in claim 4, wherein the one or more computer-readable media further store computer-executable instructions that, when executed, cause the one or more processors to perform an act comprising maintaining the list of contributor identifiers, the list comprising a predefined number of contributor identifiers having a highest respective sketch value.

13. The system as recited in claim 4, wherein the one or more computer-readable media further store computer-executable instructions that, when executed, cause the one or more processors to perform an act comprising maintaining the list of contributor identifiers, the list comprising a predefined number of contributor identifiers having a highest respective estimated cumulative value.

14. A method comprising:
receiving first data representing a first contributor identifier and a first value;
determining, based at least in part on the first value and using a count-min-sketch probabilistic data structure, a first sketch value associated with the first contributor identifier;
determining that the first sketch value is greater than a minimum sketch value associated with a second contributor identifier,
updating a list of contributor identifiers to include the first contributor identifier and an estimated cumulative value associated with the first contributor identifier, and
updating the list of contributor identifiers to remove the second contributor identifier.

15. The method as recited in claim 14, further comprising determining the estimated cumulative value associated with the first contributor identifier, the estimated cumulative value associated with the first contributor identifier comprising a lesser of: (i) the first sketch value, and (ii) an estimated cumulative value associated with the second contributor identifier plus the first value.

16. The method as recited in claim 14, further comprising maintaining the list of contributor identifiers, the list comprising a predefined number of contributor identifiers having at least one of a highest respective sketch value or a highest respective estimated cumulative value.

17. The method as recited in claim 14, further comprising:
receiving second data representing a third contributor identifier and a second value;
determining, based at least in part on the second value and using the count-min-sketch probabilistic data structure, a second sketch value associated with the third contributor identifier;
determining that the third sketch value is not greater than the minimum sketch value; and
refraining from updating the list to include the third contributor identifier.

18. The method as recited in claim 14, further comprising:
determining, after the updating of the list, that a second sketch value associated with a third contributor identifier is a minimum sketch value represented in the list;
storing an indication that the second sketch value represents the minimum sketch value.

19. The method as recited in claim 14, further comprising:
receiving second data representing a third contributor identifier and a second value;
determining that the list includes the third contributor identifier; and
updating, in the list, an estimated cumulative value associated with the third contributor identifier by the second value.

20. The method as recited in claim 19, further comprising:
determining, based at least in part on the second value and using the count-min-sketch probabilistic data structure, a second sketch value associated with the third contributor identifier; and updating the list to indicate that the third contributor identifier is associated with the second sketch value.

\* \* \* \* \*